(12) United States Patent
Brandys et al.

(10) Patent No.: US 7,320,341 B2
(45) Date of Patent: Jan. 22, 2008

(54) PROTECTIVE LINER FOR SLURRY PIPELINES

(75) Inventors: Marie-Claude M. Brandys, London (CA); Kam C. Wu, London (CA); David E. Livingstone, Harrietsville (CA); David C. Chambers, Ilderton (CA); John T. Kilbourne, London (CA)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/383,772

(22) Filed: May 17, 2006

(65) Prior Publication Data

US 2007/0267082 A1 Nov. 22, 2007

(51) Int. Cl.
*F16L 9/14* (2006.01)
(52) U.S. Cl. .................... 138/146; 138/141; 138/98
(58) Field of Classification Search ............... 138/141, 138/146, 98
See application file for complete search history.

(56) References Cited

U.S. PATENT DOCUMENTS

| | | | | |
|---|---|---|---|---|
| 2,910,763 | A | * | 11/1959 | Lauterbach .............. 442/405 |
| 3,595,731 | A | * | 7/1971 | Davies .................. 428/151 |
| 3,654,014 | A | * | 4/1972 | Merminod ............... 156/215 |
| 4,042,559 | A | | 8/1977 | Abelson et al. |
| 4,227,350 | A | | 10/1980 | Fitzer |
| 4,684,556 | A | * | 8/1987 | Ohtsuga et al. ........... 428/36.1 |
| 4,754,685 | A | | 7/1988 | Kite et al. |
| 5,077,107 | A | * | 12/1991 | Kaneda et al. .......... 428/36.1 |
| 5,164,237 | A | * | 11/1992 | Kaneda et al. .......... 428/34.7 |
| 5,301,984 | A | | 4/1994 | Farris |
| 5,646,076 | A | * | 7/1997 | Bortz .................. 442/136 |
| 5,857,494 | A | * | 1/1999 | Tsukamoto et al. ....... 138/140 |
| 6,170,531 | B1 | * | 1/2001 | Jung et al. .............. 138/98 |
| 6,607,645 | B1 | | 8/2003 | Sarkar |
| 6,737,134 | B2 | | 5/2004 | Friedrich et al. |
| 2005/0020170 | A1 | * | 1/2005 | Deka et al. ............. 442/327 |

FOREIGN PATENT DOCUMENTS

| | | |
|---|---|---|
| AU | 9656084 | 1/1997 |
| CA | 1 142 815 | 3/1983 |
| EP | 0 242 860 A1 | 10/1987 |

OTHER PUBLICATIONS

Kehr, J.Alan, *Fusion Bonded Epoxy (FBE): A Foundation for Pipeline Corrosion Protection*, NACE Press (Houston, TX); 2003; pp. 108-120.

\* cited by examiner

*Primary Examiner*—James Hook
(74) *Attorney, Agent, or Firm*—Gregg H. Rosenblatt

(57) ABSTRACT

A pipe comprises an outer surface and an inner surface, where the inner surface includes an abrasion resistant material layer covering a substantial portion thereof. An adhesive layer affixes the abrasion resistant material layer to the inner surface. The abrasion resistant layer can reduce and prevent erosion-corrosion of the inner surface of a pipe transporting slurry.

10 Claims, 1 Drawing Sheet

PROTECTIVE LINER FOR SLURRY PIPELINES

FIELD OF THE INVENTION

The present invention relates to an abrasion resistant liner for pipes or other vessels transporting abrasive slurry.

BACKGROUND

In the mining, oil and gas industries, pipelines transport a variety of liquids, gases and slurries. The transport of certain raw materials, particularly in a water-based (or steam-based) slurry form, have been noted to be particularly damaging to pipes, causing wear through abrasion, corrosion, and/or erosion of the steel, sometimes referred to as "erosion-corrosion".

The oil sands mining operations in Western Canada offer a potentially large supply of oil for North America and the rest of the world. The mined oil sands are typically carried by processing pipes to the extraction plant in the form of a water-based slurry. The extraction operation produces bitumen and a sand by-product referred to as tailings. These tailings are in slurry form and are highly abrasive, thus highly damaging to the processing pipes, also referred to as tailings pipes. These pipelines can be formed of many miles of steel piping that can vary from 8 to 80 inches in diameter and transport the tailings to the settling ponds.

A conventional method to address the damage caused by the oil sands slurry involves rotating the tailings pipe to even out the wear on the inner surface of the pipe. The rotation operation is very expensive and difficult. Even with this method, tailings pipes often need to be replaced after as little as a few months of operation. Other conventional methods include depositing a rubber inner sleeve in the pipe. However, rubber inner sleeves have a tendency to collapse and may not be applied on all pipe configurations.

SUMMARY

In one aspect, the present invention provides a pipe comprising an outer surface and an inner surface, where the inner surface includes an abrasion resistant material layer covering a substantial portion thereof, and where an adhesive layer affixes the abrasion resistant material layer to the inner surface. The abrasion resistant material layer can comprise a non-woven web material, such as nylon. The non-woven web material can comprise a uniform cross-section, open, porous, lofty web having at least one layer, where each layer comprises a multitude of continuous three-dimensionally undulated filaments of high yield strength filament-forming organic thermoplastic material with adjacent filaments being inter-engaged and autogenously bonded where they touch one another.

In another aspect, a slurry transport system comprises a pipe that includes an outer surface and an inner surface to transport a sand-based slurry. The inner surface includes an abrasion resistant material layer covering a substantial portion thereof, where an adhesive layer affixes the abrasion resistant material layer to the inner surface. The abrasion resistant material layer captures sand particles of the slurry to form a sand-based surface of the abrasion resistant material layer.

The above summary of the present invention is not intended to describe each illustrated embodiment or every implementation of the present invention. The figures and the detailed description that follows more particularly exemplify these embodiments.

Figure 1A:
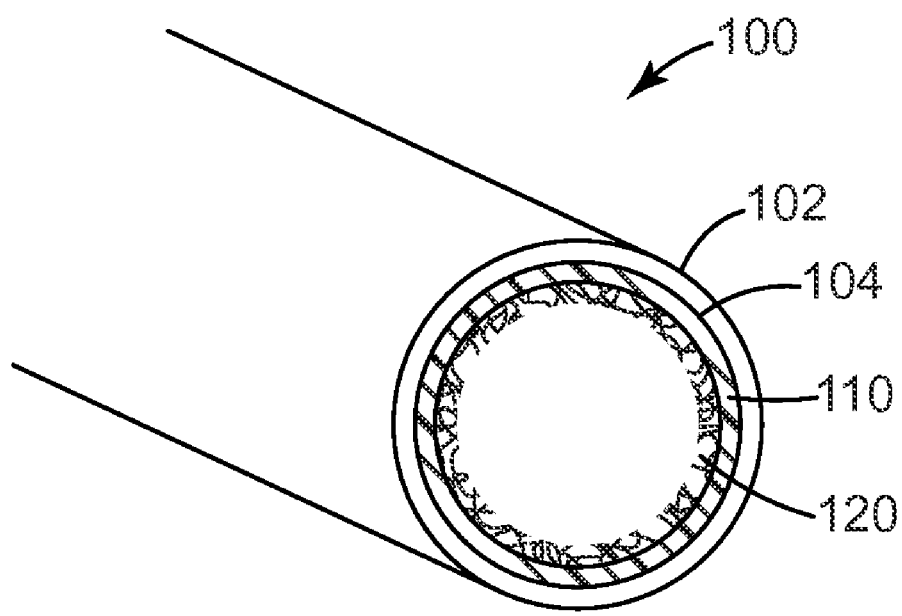
FIG. 1A is a schematic representation of a pipe having an exemplary abrasion resistant liner applied on an inner surface of the pipe according to an aspect of the present invention.

These figures are not drawn to scale and are intended only for illustrative purposes. While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

Aspects of the present invention relate to an abrasion resistant liner for pipelines transporting slurry. In particular, the abrasion resistant liner is coated on a substantial portion of an inner surface of a pipe or transport vessel. In operation, the pipe or vessel will transport a watery slurry of sand and other particles to a remote location. During the transport, a portion of the slurry (sand) particles will be captured by the surface of the abrasion resistant liner, which substantially reduces the exposure of the pipe's inner surface to the slurry. After a build-up, the abrasion resistant liner will include a top surface of trapped sand. Additional slurry will pass over the top surface as a sand-on-sand interaction, while damage to the underlying pipe is substantially reduced or eliminated.

FIG. 1A shows an exemplary embodiment of a pipe or transport vessel 100. The pipe 100 includes an outer surface 102 and an inner surface 104. Pipe 100 can be formed from a conventional pipe material, such as steel.

Figure 1B:
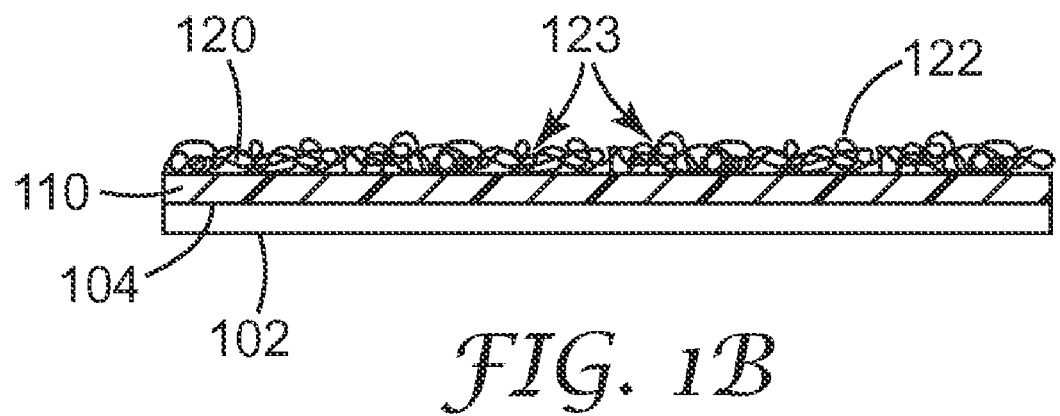
FIG. 1B is a cross section view of an exemplary abrasion resistant liner according to an aspect of the present invention.

In an exemplary embodiment, pipe 100 is used to transport a watery slurry of sand and other particles. The slurry is highly destructive to the inner surface 104 of pipe 100. To protect the inner surface, an abrasion resistant material 120 is used to coat at least a substantial portion of the surface 104 (e.g., at least about 40% of the inner circumference). An adhesive layer 110 can be used to adhere the abrasion resistant material 120 to inner pipe surface 104. A schematic (and flattened) cross section view of the coated inner surface is shown in FIG. 1B.

In an exemplary embodiment, the adhesive layer 110 can anchor the abrasion resistant layer 120 in place and also provide some additional corrosion protection for the internal areas of the slurry pipe. The adhesive layer 110 can comprise, for example, a liquid epoxy-based material or a urethane-based material. Exemplary liquid epoxy coatings can comprise diglycidyl ether of bisphenol-A, some epoxy diluents, fillers, and coating additives. These coatings can be cured, for example, by aliphatic amines. An exemplary material for coating 110 is commercially available under the trade name Scotchkote™ 327 (available from 3M Company, St. Paul Minn.).

An exemplary abrasion resistant material 120 comprises a relatively flexible web of polymer material. For example, a nylon-based, non-woven web material can be utilized. Such a material can be a uniform cross-section, open, porous, lofty web having at least one layer, where each layer comprises a multitude of continuous three-dimensionally undulated filaments of high yield strength filament-forming organic thermoplastic material with adjacent filaments being inter-engaged and autogenously bonded where they touch one another. The cured material can have a tensile strength of at least 3000 psi, an ultimate elongation of at least 180% and a Shore D hardness of at least about 40. Such an exemplary material, and methods of making such a material, are described in U.S. Pat. No. 4,227,350 (incorporated by reference herein, in its entirety). Such abrasion resistant material is commercially available under the tradename Scotch-Brite™ Clean and Strip™ (available from 3M Company, St. Paul, Minn.). Alternative non-woven web material types may be selected based on the abrasiveness of the slurry to be transported. Tougher materials may be optimally employed for more abrasive mixtures, while less tough and more flexible materials may be employed for less abrasive slurry. The flexibility or toughness of the materials can be dependent, for example, on the size and type of the fiber and density of the fibrous mesh.

Alternatively, abrasion resistant material 120 can comprise a porous material with sufficient toughness or abrasion resistance that can retain or trap sand particles to provide sand-on-sand contact when the pipeline is charged. One exemplary polymeric material for forming the filaments of the web of the abrasive is polyamide, such as polycaprolactam and polyhexamethylene adipamide (e.g., nylon 6 and nylon 6,6). Other useful filament-forming polymeric materials include polyolefins (e.g., polypropylene and polyethylene), polyesters (e.g., polyethylene terephthalate), polycarbonate and the like.

The open, web configuration of the abrasion resistant material 120 creates a multitude of small pits, crevices, and holes 123 throughout a top surface 122 of the abrasion resistant material. During slurry transport, sand and other particles can be captured in the pits and holes of abrasion resistant material 120. When the crevices, holes and pits become filled, the slurry will pass over the sand-filled top surface 122. In addition, abrasion resistant material 120 helps prevent the deterioration of surface 104 of the pipe or vessel. The sand-on-sand contact can provide a number of advantages, for example, in that the sand layer is somewhat free to move thereby can absorb the energy of the slurry (as opposed to the pipe surface) and in that the sand layer is self-replenishing.

In a pipe manufacturing assembly line, a pipe 100 can be formed using conventional techniques such as described in described in J. A. Kehr, "Fusion-Bonded Epoxy (FBE): A Foundation for Pipeline Corrosion Protection", NACE Press (Houston, Tex.), 2003 (see e.g., pages 108-120). The abrasion resistant inner lining applied to inner surface 104 of pipe 100 can be formed as follows. First, the adhesive layer 110, such as a liquid epoxy, can be applied to inner surface 104 using a conventional spraying technique, such as is described in the Kehr reference (see e.g., page 198). Prior to the full curing of adhesive layer 110, abrasion resistant layer 120 can be applied to the partially cured coating affixed to a substantial circumferential portion of the inner surface 104 (e.g., about 40% or greater of the circumference of surface 104), as slurry typically fills less than half the volume of pipe 100.

For example, the abrasion resistant liner material 120, such as described above, can be provided in a roll format, in widths complimentary to the interior dimensions of the pipe (e.g. inner diameter and length). The material can be off wound from its roll onto a powered, rotatable core having a comparable length to that of the pipe lengths employed. The off wind can be an overlapping spiral with circumference and overlap dimensions determined by the pipe inner diameter. The rotatable core can enter the pipe interior as the liner is wound about it. Alternatively, the rotatable core may be inserted into the pipe interior upon completion of the overlapping spiral wind. The outer diameter of the spiral wind can be dimensioned to effectively clear (be smaller than) the inner diameter of the pipe so as not to disrupt or damage the wet adhesive during core insertion.

Once fully installed within the pipe, the core can be rotated counter to the spiral wind direction such that the non-woven liner material expands and contacts the adhesive. The expansion of the spiral wind can be forced to occur from the distal end of the core support and can progress towards the support until installation is complete. The edges of the liner can be butted against each other in the spiral unwind process such that the pipe interior is completely coated with the liner. To achieve this butting configuration, the spiral wind can be of appropriate diameter and overlap, as mentioned previously. The unwinding of the core also applies sufficient pressure to the material to force an optimum bond with the adhesive layer 110. Preferably, the core can have a surface sufficient to grip the structure of the non-woven liner material while also allowing it to release as the spiral wind of liner plays out. The distal end of the core could have support applied once the core reaches the end of the pipe to aid in the stability of the process.

Thus, an abrasion resistant inner coating can be provided to pipe or vessel 100 to increase its operational lifetime in transporting slurry by reducing or eliminating the exposure of the inner surface to erosion-corrosion. Such a coating can reduce or eliminate the need to physically rotate pipe 100 in the field, which significantly reduces operational costs and difficulty.

While the present invention has been described with a reference to exemplary preferred embodiments, the invention may be embodied in other specific forms without departing from the scope of the invention. Accordingly, it should be understood that the embodiments described and illustrated herein are only exemplary and should not be considered as limiting the scope of the present invention. Other variations and modifications may be made in accordance with the scope of the present invention.

The invention claimed is:

1. A slurry transport system, comprising a pipe or vessel that includes an outer surface and an inner surface to transport a particle-based slurry, wherein the inner surface includes a protective material layer covering a substantial portion thereof, wherein an adhesive layer affixes the protective material layer to the inner surface, and wherein the protective material layer comprises a plurality of open surface features that retain slurry particles passing thereover to form a particle-based surface layer on the protective material layer.

2. The slurry transport system according to claim 1, wherein the protective material layer comprises a non-woven web material.

3. The slurry transport system according to claim 2, wherein the non-woven web material comprises a filament forming polymeric material.

4. The slurry transport system according to claim 2, wherein the non-woven web material comprises a uniform cross-section, open, porous, lofty web having at least one layer, wherein each layer comprises a multitude of continuous three-dimensionally undulated filaments of high yield strength filament-forming organic thermoplastic material with adjacent filaments being inter-engaged and autogenously bonded where they touch one another.

5. The slurry transport system according to claim 1, wherein the protective material comprises a high yield strength filament forming organic thermoplastic material.

6. The slurry transport system according to claim 1, wherein the protective material has a tensile strength of at least 3000 psi.

7. The slurry transport system according to claim 1, wherein the protective material has a shore D hardness of at least about 40.

8. A method of transporting a slurry, comprising:

providing a vessel that includes an outer surface and an inner surface to transport a slurry, wherein the inner surface includes a protective material layer covering a substantial portion thereof, wherein an adhesive layer affixes the protective material layer to the inner surface, and wherein the protective material layer comprises a plurality of open surface features that retain slurry particles passing thereover to form a particle-based surface layer on the protective material layer; and charging the vessel with the slurry, wherein the protective material has sufficient toughness to retain the particles of the slurry to form a surface of trapped particles.

9. The method of claim 8, wherein the particles include sand and wherein the surface layer is a sand layer that provides sand-on-sand contact when the vessel is charged.

10. The method of claim 8, wherein the vessel comprises a pipe.

* * * * *